US007899987B2

(12) United States Patent
Salomon et al.

(10) Patent No.: US 7,899,987 B2
(45) Date of Patent: Mar. 1, 2011

(54) FILE STORAGE IN A COMPUTER SYSTEM WITH DIVERSE STORAGE MEDIA

(75) Inventors: Tavi Salomon, Holon (IL); Itzhak Pomerantz, Kfar Saba (IL); Eyal Peri, Kibbutz Nir David (IL)

(73) Assignee: SanDisk IL Ltd., Kfar Saba (IL)

( * ) Notice: Subject to any disclaimer, the term of this patent is extended or adjusted under 35 U.S.C. 154(b) by 634 days.

(21) Appl. No.: 11/861,165

(22) Filed: Sep. 25, 2007

(65) Prior Publication Data

US 2008/0288714 A1 Nov. 20, 2008

Related U.S. Application Data

(60) Provisional application No. 60/917,939, filed on May 15, 2007.

(51) Int. Cl.
*G06F 12/00* (2006.01)

(52) U.S. Cl. ................... 711/112; 711/103; 711/156; 711/165; 711/E12.001

(58) Field of Classification Search ........................ None
See application file for complete search history.

(56) References Cited

U.S. PATENT DOCUMENTS

| 5,420,998 | A | 5/1995 | Horning |
| 5,778,418 | A | 7/1998 | Auclair et al. |
| 5,860,083 | A | 1/1999 | Sukegawa et al. |
| 7,583,537 | B2 * | 9/2009 | Nakatani ............... 365/185.24 |

| 2002/0069354 | A1 | 6/2002 | Fallon et al. |
| 2005/0172074 | A1 * | 8/2005 | Sinclair ...................... 711/114 |
| 2005/0188278 | A1 * | 8/2005 | Zimmer et al. ................ 714/42 |
| 2005/0240726 | A1 | 10/2005 | Williams |
| 2007/0083575 | A1 | 4/2007 | Leung et al. |

(Continued)

FOREIGN PATENT DOCUMENTS

WO 9750035 12/1997

(Continued)

OTHER PUBLICATIONS

Kim et al., Energy-Efficient File Placement Techniques for Hterogeneous Mobile Storage Systems, Oct. 22-25, 2006, Int. Conf. Embedded Softw.EMSOFT; IEEE International Conference on embedded Software, EMSOFT 2006; proc. of the 6th ACM and IEEE International Conference on Embedded Software, EMSOFT 2006, pp. 171-177.*

(Continued)

*Primary Examiner*—Reginald G Bragdon
*Assistant Examiner*—Shawn X Gu
(74) *Attorney, Agent, or Firm*—Brinks Hofer Gilson & Lione

(57) ABSTRACT

A method for storing data in a computer having a magnetic hard disk drive (HDD) and an electronic solid-state drive (SSD). The method includes configuring the computer so that the HDD and the SSD are each independently accessible by an operating system of the computer. A plurality of files is received for storage by the computer. A predicted use profile of the computer is defined. A respective one of the HDD and the SDD is selected for the storage of each of the files responsively to the predicted use profile.

43 Claims, 6 Drawing Sheets

U.S. PATENT DOCUMENTS

| 2007/0174546 | A1 | 7/2007 | Lee |
| 2007/0174580 | A1 | 7/2007 | Shulga |
| 2007/0186039 | A1 | 8/2007 | Nam |
| 2008/0244172 | A1* | 10/2008 | Kano ............................ 711/112 |

FOREIGN PATENT DOCUMENTS

| WO | 02082277 | 10/2002 |

OTHER PUBLICATIONS

U.S. Appl. No. 60/917,939.

Saloman, Tavi. "Vaulter Disk Full Mini PCI Express Card," Sandisk Corp., Apr. 2007.

Windows PC Accelerators, Nov. 30, 2006.

VaulterO Disk Vista Deployment Tool, User Guide, Sandisk Corp. Aug. 2007.

VaulterO Disk Vista Deployment Tool, Detailed Scripts, Sandisk Corp. Aug. 2007.

Golding, Richard et al. "*Attribute-managed storage*," Presented at the Workshop on Modeling and Specification of I/O (MSIO), San Antonio, Texas, Oct. 1995.

Kim Young-Jin, et al., "Energy-efficient file placement techniques for heterogeneous mobile storage systems," Int. Conf. Embedded Softw. EMSOFT; IEEE International Conference on embedded Software, EMSOFT 2006; proc. of the $6^{th}$ ACM and IEEE International Conference on Embedded Software, EMSOFT 2006, pp. 171-177 (Oct. 22-25, 2006).

An Office Action dated Sep. 6, 2010, which issued during the prosecution of Applicant's European Patent Application No. 08 738 313.9 (7 pages).

\* cited by examiner

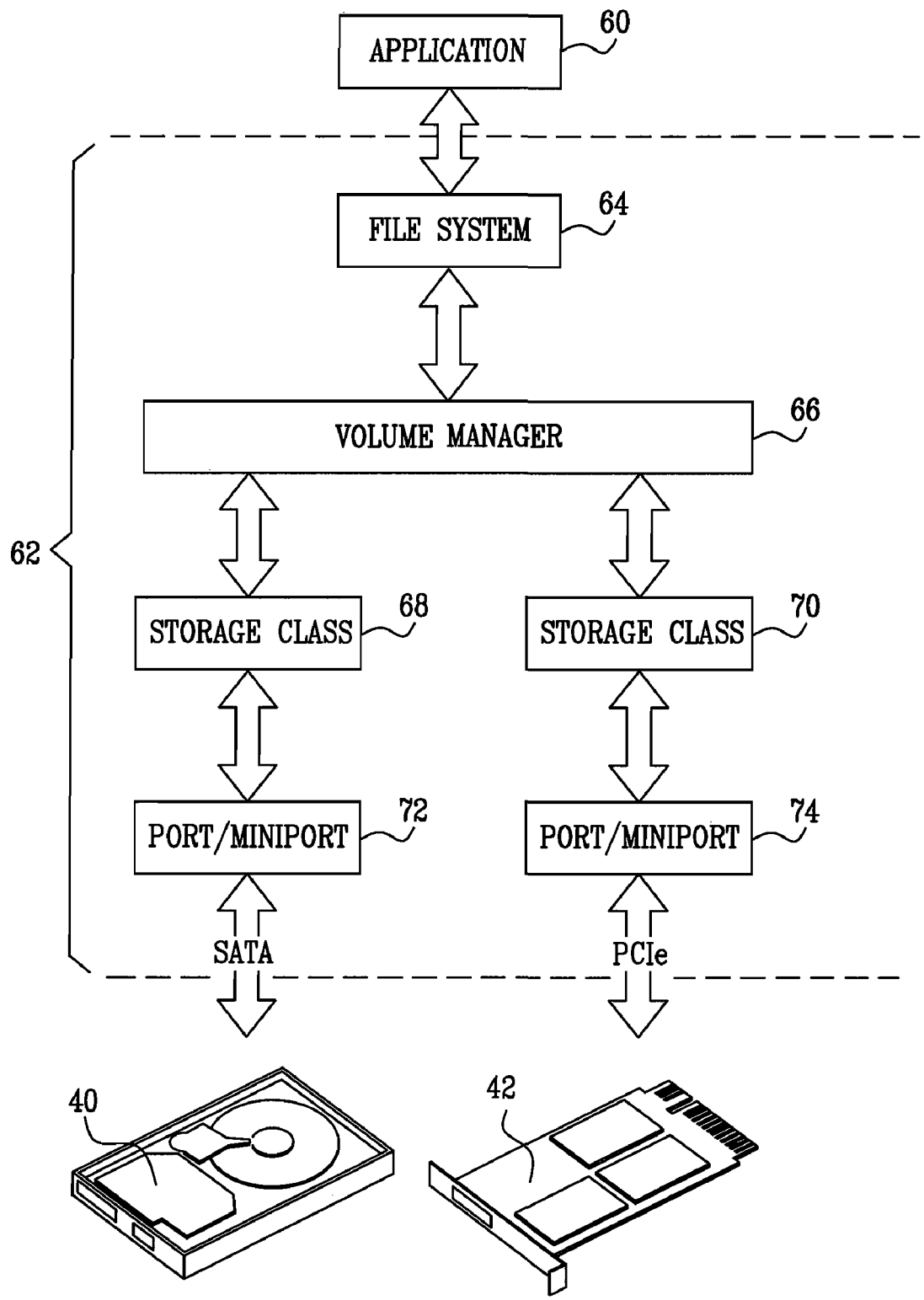

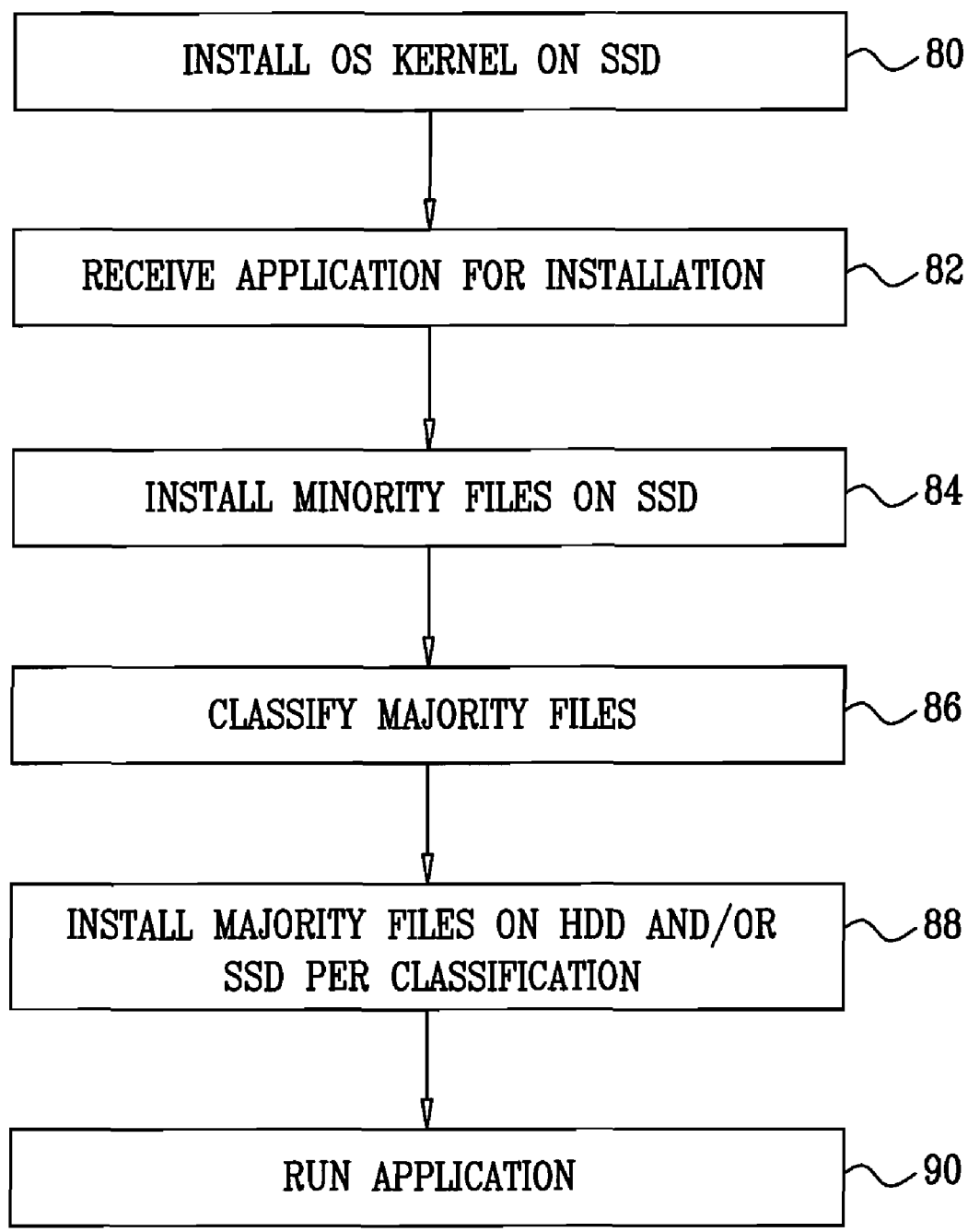

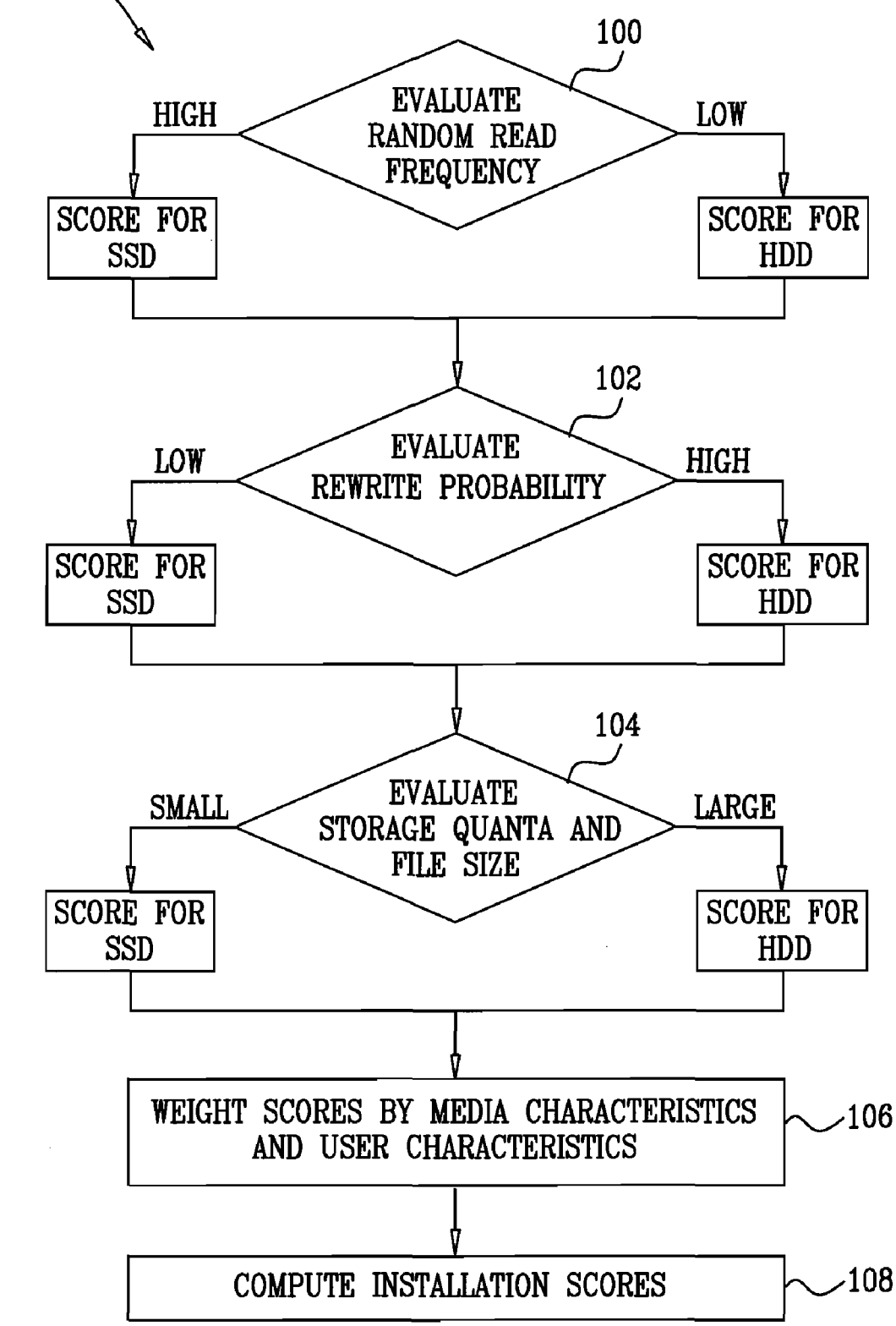

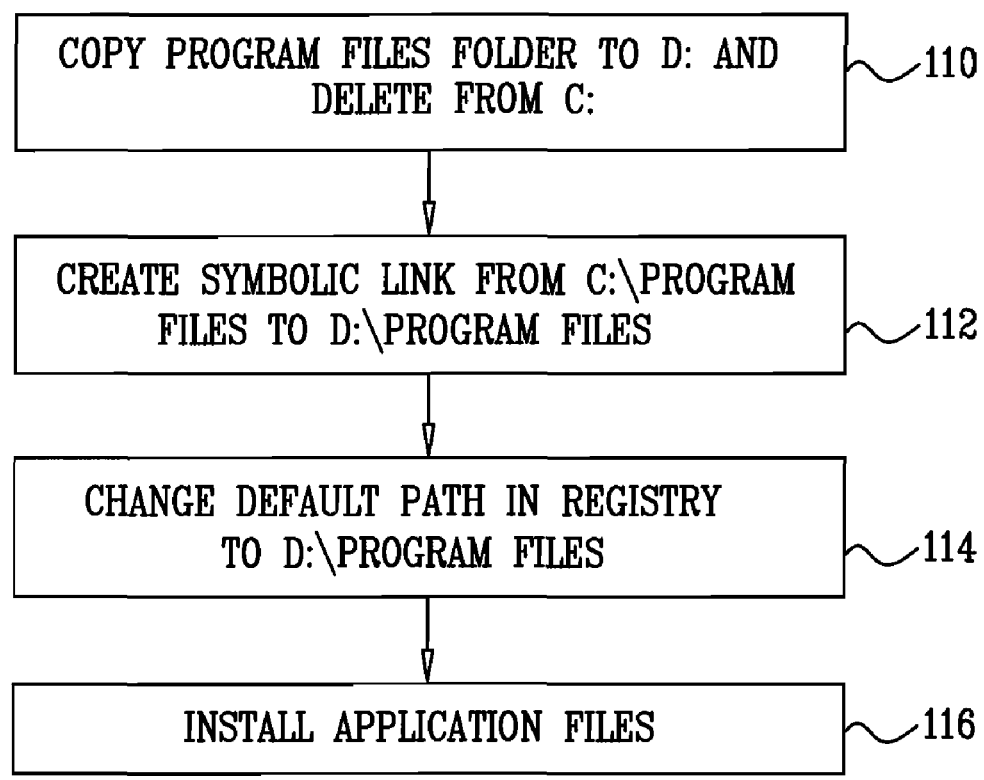

FILE STORAGE IN A COMPUTER SYSTEM WITH DIVERSE STORAGE MEDIA

CROSS-REFERENCE TO RELATED APPLICATION

This application claims the benefit of U.S. Provisional Patent Application 60/917,939, filed May 15, 2007, which is incorporated herein by reference.

COPYRIGHT NOTICE

A portion of the disclosure of this patent document contains software code that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to computer systems, and specifically to data storage in a computer system.

BACKGROUND OF THE INVENTION

Most personal computers at present contain a magnetic hard disk drive (HDD) as their primary non-volatile storage medium. Solid-state drive (SSD) storage devices (also referred to as "solid-state disks"), however, are becoming increasingly popular as an alternative to the magnetic hard disk. SSD devices typically use electronic memory, either non-volatile memory, such as flash memory, or, in some cases, battery-backed volatile memory, such as synchronous dynamic random access memory (SDRAM). The SSD is typically more costly (in terms of dollars per gigabyte) than the HDD, but has marked advantages such as faster random read access and lower power consumption and audible noise.

It is also possible to configure a computer with both HDD and SSD. For example, U.S. Pat. No. 5,778,418, whose disclosure is incorporated herein by reference, describes a computer system in which a solid-state flash EEPROM system is combined with a rotating disk drive memory to provide mass program and data storage. A common memory controller directs system-generated memory addresses in a disk format to either the EEPROM system or disk memory in a manner that is transparent to the computer system processor. A particular program or data file may then be stored in the portion of the memory system that is best suited to handle it, and thus may take advantage of the different features and characteristics of the EEPROM and magnetic disk memory.

U.S. Patent Application Publication 2005/0240726, whose disclosure is incorporated herein by reference, describes a synergistic hybrid disk drive (SHDD), in which two or more disk drives, with different performance characteristics, communicate directly with each other. This arrangement is said to supply data to a computer system faster and more reliably than would be expected from either individual disk drive. A "SHDD control function" may include statistics regarding the number of times each data file is retrieved by the host computer without being rewritten and the number of times the data file has been rewritten. Seldom-changed data may be stored on a slower but larger capacity disk drive, while more frequently-changed data are stored on a lower capacity but faster disk drive in the SHDD.

U.S. Patent Application Publication 2007/0083575, whose disclosure is incorporated herein by reference, describes automated techniques for storing data in a heterogeneous storage environment based on storage policies. The stated object of these techniques is to store data in storage locations that enable efficient data access while optimizing the use of available storage resources with minimum human intervention. The storage policy specifies when and how data are to be stored and/or migrated and includes rules and scores based on characteristics of the storage devices and of the data files.

SUMMARY OF THE INVENTION

An embodiment of the present invention provides a method for storing data in a computer having a magnetic hard disk drive (HDD) and an electronic solid-state drive (SSD), the method including:

configuring the computer so that the HDD and the SSD are each individually accessible by an operating system of the computer;

receiving a plurality of files for storage by the computer;

defining a predicted use profile of the computer; and selecting a respective one of the HDD and the SDD for the storage of each of the files responsively to the predicted use profile.

In one embodiment, defining the predicted use profile includes receiving an input from the user indicative of a preference of the user in operating the computer. The input may be indicative of a weight to be assigned to a factor relating to the computer selected from a group of factors consisting of power saving, boot time, silence of operation, responsiveness of operation, and portability. Additionally or alternatively, defining the predicted use profile includes automatically monitoring a behavior of the user in operating the computer.

Defining the predicted use profile may include determining that the computer is to be used primarily for games or for office applications.

In some embodiments, selecting the respective one of the HDD and the SDD includes choosing the respective one of the HDD and the SDD for each of the files responsively to respective access properties of the files in the set. Typically, the access properties are selected from the group of file properties consisting of a read frequency of the files, a write frequency of the files, a size of storage quanta for rewriting of the files, a size of the files, and a type of data in the files.

Additionally or alternatively, selecting the respective one of the HDD and the SDD includes choosing the respective one of the HDD and the SDD for each of the files responsively to respective characteristics of the HDD and the SDD. Typically, the respective characteristics are selected from a group of storage characteristics consisting of a cost of the storage media, a random read access time of the storage media for files of a specified type, a capacity of the storage media, a power consumption of the storage media, an age of the storage media, a write access time of the storage media, an audible noise characteristic of the storage media, wear of the storage media due to rewriting, and a sensitivity to motion during operation of the storage media.

Further additionally or alternatively, selecting the respective one of the HDD and the SDD may include choosing the respective one of the HDD and the SDD for each of the files responsively to a property of the computer. The property of the computer is selected from a group of factors consisting of storage cost, a pattern of read access, power consumption, total storage capacity, and system age.

There is furthermore provided, in accordance with an embodiment of the present invention, a method for operating a computer system having first and second storage drives, the method including:

receiving a software package for installation on the computer system, the software package including at least a first file and a second file, which contains instructions including a call to a predetermined location of the first file on the first storage drive;

storing at least the first file at a target location on the second storage drive;

creating a link on the computer system from the predetermined location on the first storage drive to the target location on the second storage drive; and executing the instructions in the second file, whereupon the link directs the call to the target location of the first file.

In a disclosed embodiment, the software package includes an application program, and kernel files of an operating system of the computer system are installed on the first storage drive. Typically, the first storage drive is identified by the operating system as drive C:, and the second storage drive is associated by the operating system with another drive identifier, wherein the link includes a symbolic link.

Additionally or alternatively, the method includes creating an entry indicating a path to the software package on the second storage device in an index maintained by an operating system of the computer system.

In one embodiment, storing at least the first file includes moving the first file from the predetermined location to the target location in response to a change in the computer system.

Another embodiment of the present invention provides a method for storing data in a computer system having electronic and magnetic storage media, including:

in a set of files for storage on the computer system, identifying first files having first probabilities of being rewritten and second files having second probabilities of being rewritten that are greater than the first probabilities; and storing the first files in the electronic storage medium while storing the second files in the magnetic storage medium.

In one embodiment, the first files are protected so that a user of the computer system is unable to rewrite the first files.

In a disclosed embodiment, the electronic storage medium includes a Flash memory. Alternatively, the electronic storage medium may include a 3D memory or a one-time programmable memory.

In some embodiments, the first and second files respectively include first and second program files belonging to a computer program, and the first and second files are stored in a process of installing the computer program on the computer system. In one embodiment, the computer program is at least a part of an operating system of the computer system. In another embodiment, the computer program is at least a part of an application program that is to run on the computer system.

Typically the first files include operating system kernel files, while the second files include page files and swapping files. Additionally or alternatively, the method includes storing a hibernation file on the electronic storage media or storing a repository for deleted files on the electronic storage media. In some embodiments, the second files include application program files or user files and temporary files.

In a disclosed embodiment, at least one of the first and second files contains instructions including a call to a predetermined location of one of the second files on the electronic storage drive, and the method includes creating a link on the computer system from the predetermined location on the electronic storage medium to a target location on the magnetic storage medium at which the one of the second files is stored.

Typically, the computer system includes a central processing unit (CPU) and respective, first and second storage controllers for the electronic and magnetic storage media, and the CPU is configured to communicate directly with both of the first and second storage controllers. In one embodiment, the CPU is configured to run software that includes a file system and a volume manager, which interfaces between the file system and the first and second storage controllers.

There is also provided, in accordance with an embodiment of the present invention, a method for storing data in a computer system having electronic and magnetic storage media, including:

in a set of program files, identifying first program files having first frequencies of being rewritten and second program files having second frequencies of being rewritten that are greater than the first frequencies; and installing the first program files in the electronic storage medium while installing the second program files in the magnetic storage medium.

There is additionally provided, in accordance with an embodiment of the present invention, a method for storing data in a computer system having electronic and magnetic storage media, including:

in a set of files for installation on the computer system, identifying first files that are protected so that a user of the computer system is unable to rewrite the first files, and second files that may be rewritten by the user; and storing the first files in the electronic storage medium while storing the second files in the magnetic storage medium.

There is also provided, in accordance with an embodiment of the present invention, a method for storing data in a computer system having electronic and magnetic storage media, comprising:

receiving a set of files for storage on the computer system, the set comprising first files having respective first probabilities of being rewritten and second files having respective second probabilities of being rewritten that are greater than the first probabilities, the first and second files having respective identifiers that are indicative of the respective probabilities of being rewritten; and responsively to the respective identifiers, storing the first files in the electronic storage medium while storing the second files in the magnetic storage medium.

Typically, the magnetic storage media and the electronic storage media are embodied respectively in a magnetic hard disk drive (HDD) and an electronic solid-state drive (SSD), which are independently accessible by an operating system of the computer.

There is further provided, in accordance with an embodiment of the present invention, a method for configuring a computer system, the method including:

storing minority files of a software package on a first storage drive of the computer system; and storing at least some majority files of the software package on a second storage drive of the computer system.

In one embodiment, the software package includes an operating system. In another embodiment, the software package includes an application program, and a kernel of an operating system of the computer system is stored on the first storage drive.

Typically, the majority files are distributed between the first and second storage drives.

In a disclosed embodiment, storing the at least some majority files includes specifying different, respective characteristics of the first and second storage drives, determining respective access properties of the files in the set, computing respective installation scores for the majority files responsively to the respective access properties and to the respective characteristics of the storage drives, and installing the majority files on the first and second storage drives responsively to the respective installation scores. Computing the respective installation scores may include receiving an input from a user indicating a weight to be applied to one or more of the characteristics of the storage drives, and calculating the installation scores responsively to the weight. Additionally or alternatively, computing the respective installation scores includes receiving an input from a user indicating a weight to be applied to one or more of the access properties, and calculating the installation scores responsively to the weight. Further alternatively or additionally, storing the at least some majority files includes identifying first files among the majority files that are to be stored on the second storage drive irrespective of the scores, and wherein computing the respective installation scores includes calculating the scores only with respect to second files, disjoint from the first files, among the majority files.

In one embodiment, storing the at least some majority files includes evaluating an expected use of the computer system, and selecting one or more of the majority files to store on the first storage drive responsively to the expected use.

There is also provided, in accordance with an embodiment of the present invention, a computer storage system, including:

an electronic storage medium;

a magnetic storage medium; and at least one storage controller, which is configured to carry out one or more of the methods recited above.

There is additionally provided, in accordance with an embodiment of the present invention, a computer software product, comprising a computer-readable medium in which program instructions are stored, which instructions, when read by a computer, cause the computer to carry out one or more of the methods recited above.

The present invention will be more fully understood from the following detailed description of the embodiments thereof, taken together with the drawings in which:

BRIEF DESCRIPTION OF THE DRAWINGS

FIG. 3 is a block diagram that schematically illustrates software components of a computer system with multiple storage drives, in accordance with an embodiment of the present invention;

FIG. 4 is a flow chart that schematically illustrates a method for installing software on a computer system, in accordance with an embodiment of the present invention;

FIG. 5 is a flow chart that schematically illustrates a method for computing scores for use in determining the storage drive on which a file is to be installed, in accordance with an embodiment of the present invention; and FIG. 6 is a flow chart that schematically illustrates a method for installing application files on a computer system with multiple storage drives, in accordance with an embodiment of the present invention.

DETAILED DESCRIPTION OF EMBODIMENTS

Overview

Figure 1:
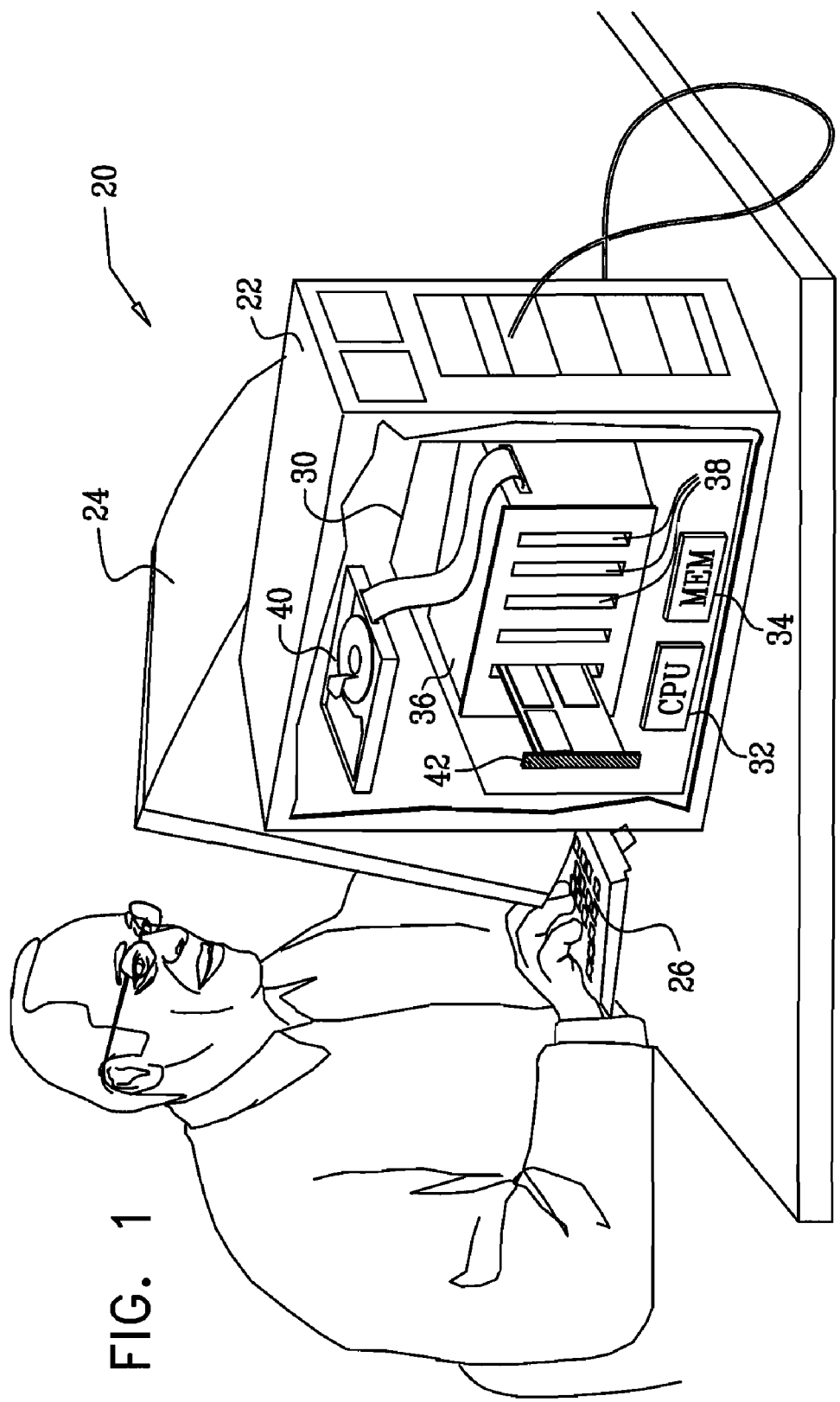
FIG. 1 is a schematic pictorial illustration of a computer system, in accordance with an embodiment of the present invention.

The embodiments of the present invention that are described hereinbelow provide techniques for exploiting the capabilities of a computer system with multiple, different storage drives in order to optimize system performance. These techniques can be used in installing the files of an operating system (OS) or application so that the files are distributed between the different storage drives. The distribution of the files may take into account the behavior of the user of the computer system, as well as the characteristics of the storage media and the access properties of the files, and possibly also properties of the host computer itself. The techniques may be applied either upon initial installation of the files on a new computer or upon adding a new storage drive to an existing computer. Although the embodiments that are described hereinbelow refer specifically to a computer system having a magnetic HDD and an electronic SSD, the principles of the present invention may similarly be applied to other combinations of different types of storage media in a computer system.

As one example of the differences in storage media characteristics, the access time for random read of data stored on a flash-based SSD can be two orders of magnitude faster than for a HDD. On the other hand, the SSD has little advantage over the HDD in terms of write time, and may also suffer from wear due to repeated erasure and rewriting. Therefore, in one embodiment of the present invention, files to be stored on the computer system are classified according to their frequencies or probabilities of being rewritten during the time that they are stored on the computer. Files with high frequency or probability of being rewritten are typically stored on the HDD. On the other hand, files that must be read frequently, but are rarely rewritten (and may even be protected altogether from rewriting by the user), such as files of the OS kernel, are typically stored on the SSD.

As a result of this distribution of the files, the speed of operation of the computer system is enhanced, without compromising the lifetime of the SSD storage media. The speed of kernel operations themselves (and of application functions that use the OS kernel) is greatly increased due to the shorter access time of the SSD. The speed and responsiveness of applications are improved both because of the greater speed with which application kernel calls are executed and because access to OS files on the SSD may take place in parallel with access to application files on the HDD.

In modern operating systems, such as Microsoft® Windows®, new applications are installed on the computer by an "installer," which is itself a software application that runs on the computer. The installer typically stores the files in the application software package in two sets of locations:

Some of the files, which link the application with the operating system and with other applications, are installed in a location that is dictated by the standards of the operating system, such as in the Common Files subdirectory of the Program Files directory. These files, regarding which the user is given no choice as to the location of their installation, typically make up a minority of the files in the software package. They are therefore referred to in the present patent application and in the claims as "minority files."

The remaining files are installed in a location that may be selected by the user (although in the absence of a user selection, these files are usually installed by the installation program in a default location, such as C:\Program Files). These files are referred to in the present patent application and in the claims as "majority files."

Existing installers install all of the majority files on the same storage drive, generally on the same drive as the minority files, and typically under one folder.

Different majority files, however, may have different access properties. Therefore, in an embodiment of the present invention, the majority files are not necessarily all stored on the same drive, but may rather be distributed between the drives. For example, as noted above some of the majority files may be relatively small files that require frequent reading while the application is running. These files may be stored on the SSD together with the OS kernel files, while other majority files, which may be larger and require less frequent reading, are stored on the HDD. This distribution of files permits the application to run faster, due to both increased access speed and parallelism, as explained above, without overloading the capacity of the SSD (which is typically smaller and more costly than the HDD, at least at present). The decision as to how the majority files should be distributed between the drives may be made automatically by the installer program or interactively, under control of the user.

In one embodiment, symbolic links between the storage drives on a computer system are used to enable distribution of the files of a software application between the drives, even when the application was designed originally to run with all files on the same drive.

System Description

FIG. 1 is a schematic pictorial illustration of a computer system 20, with heterogeneous storage media that are configured in accordance with an embodiment of the present invention. System 20 comprises a console 22, which is connected to user interface components, such as a display 24 and a keyboard 26. A central processing unit (CPU) 32 and random access memory (RAM) 34 are mounted on a backplane 30, which may comprise a motherboard, for example. The backplane also comprises a system bus 36, such as a Peripheral Component Interface (PCI) or PCI Express (PCIe) bus, with multiple slots 38. A magnetic HDD 40 communicates with CPU 32 via a suitable disk interface, such as an Advanced Technology Attachment (ATA) interface.

To increase the storage capacity and enhance the performance of system 20, a SSD 42 is installed in one of slots 38. The SSD may be installed as part of the original equipment in system 20, or it may alternatively be retrofitted into the system after the system has already been in use. Installation of the SSD in a bus slot is a simple and convenient way to upgrade the computer system, since such slots are generally available in personal computers, and the Windows OS readily supports the addition of devices in such slots. Alternatively, the SSD may be connected to communicate with the CPU via a different high-speed interface, such as an ATA interface or another type of disk interface or expansion bus.

System 20 is configured so that HDD 40 and SSD 42 are each independently accessible by the operating system of the computer, i.e., the SSD is treated as an independent storage drive, rather than merely serving as a cache for the HDD as in some systems that are known in the art.

CPU 32 operates under the control of software, which enables the CPU to perform the functions that are described hereinbelow. This software may be downloaded to memory 34 in electronic form, over a network, for example, or it may be provided and/or stored on tangible media, such as on HDD 40, SSD 42, or other optical, magnetic or electronic storage media. For at least some of the functions that are described hereinbelow, the CPU may itself be programmed to serve as the storage controller. Alternatively or additionally, system 20 may comprise one or more dedicated storage controller devices, which may, for example, be integrated with HDD 40 and/or SSD 42. Therefore, the term "storage controller," as used in the present patent application and in the claims, should be understood to comprise any device or group of devices that perform the storage functions that are described herein.

Figure 2:
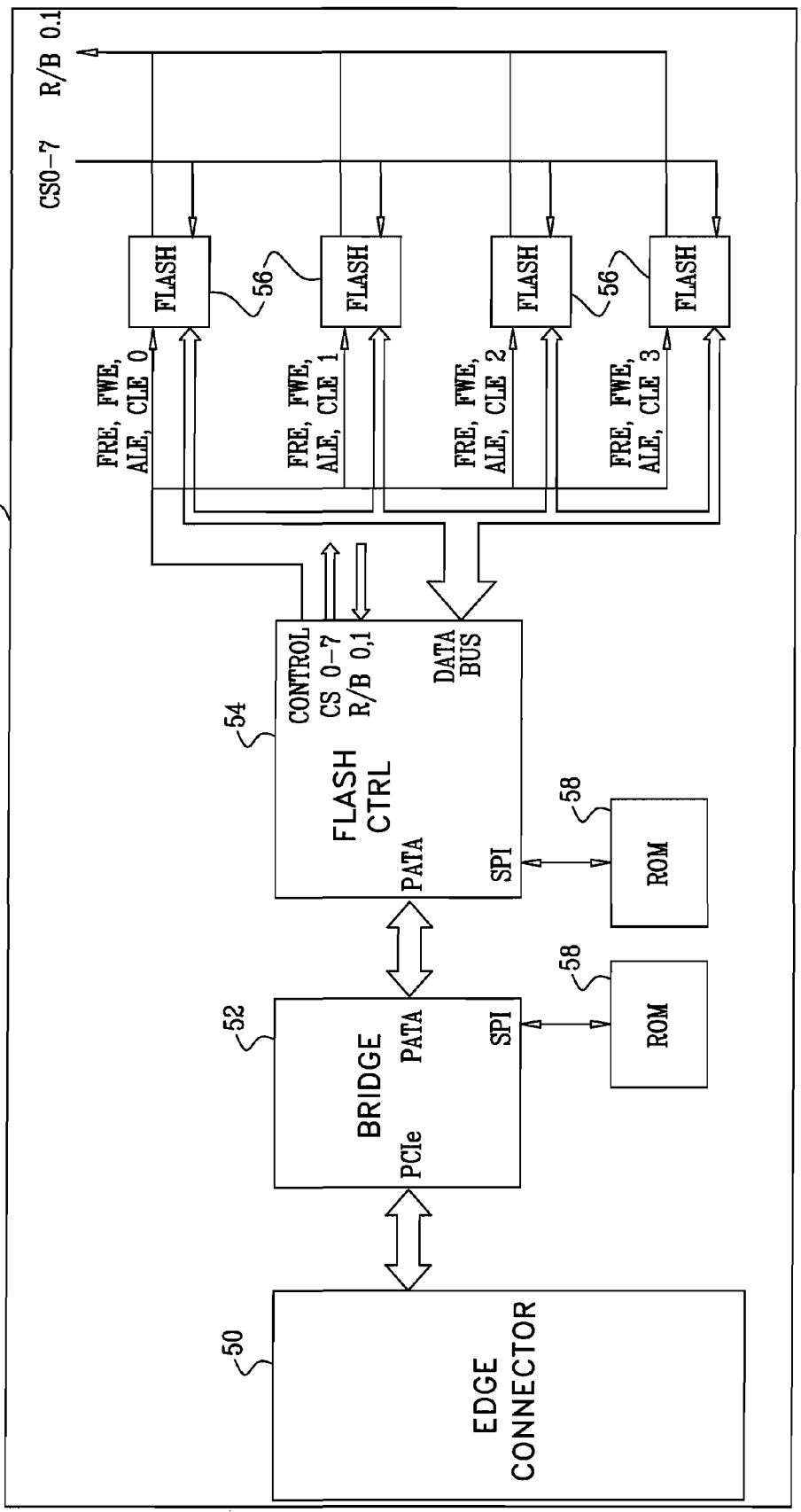
FIG. 2 is a block diagram showing details of a solid-state drive (SSD), in accordance with an embodiment of the present invention.

FIG. 2 is a block diagram that schematically shows details of SSD 42, in accordance with an embodiment of the present invention. An edge connector 50 connects to one of slots 38 in bus 36. A bridge 52 converts the bus transactions to the parallel ATA (PATA) format that is used by disks. This bridge may be a standard component, such as the JMB368 PCI Express to PATA Host Controller, produced by JMicron Technology Corp. (Hsinchu, Taiwan). A flash storage controller 54 receives the PATA disk commands and generates read and write instructions to a set of flash memory chips 56. Controller 54 thus emulates the performance of a HDD vis-à-vis CPU 32. For this purpose, the controller may use MSystems TrueFFS® technology, as described, for example, in U.S. Pat. No. 5,404,485, whose disclosure is incorporated herein by reference. Controller 54 may be a standard component, such as the PS3102 Controller produced by Phison Electronics Corp. (Hsinchu, Taiwan). Memory chips 56 typically comprise NAND flash devices, such as the K9WAG08U1A 2 GB Flash Memory, distributed by Samsung Semiconductor Inc. (San Jose, Calif.).

To read and write from and to chips 56, controller 54 generates a chip select (CS) output and a flash read enable (FRE) or flash write enable (FWE) command. The controller may also generate address latch enable (ALE) and command line enable (CLE) outputs to the flash chips as required. The flash chips indicate their status by sending a ready/busy (R/B) output to the controller. The controller exchanges data with the flash chips via a 32-bit data bus, with eight bits per chip. In addition, bridge 52 and controller 54 may each communicate with an on-board read-only memory (ROM) 58 via a serial peripheral interface (SPI). Memories 58, which are typically implemented as electronically-erasable programmable ROM (EEPROM), support boot functionality and software patches if required.

As an aid to understanding a possible implementation of elements of the present invention, FIGS. 1 and 2 show a certain particular configuration and design of system 20 and specifically of SSD 42. This implementation, however, is shown solely by way of example. The principles of the present invention may similarly be applied using solid-state drives of other types and in other system configurations. For example, SSD 42 may comprise memory chips of other types, such as three-dimensional (3D) memory chips, SDRAM, or one-time programmable memory chips.

FIG. 3 is a block diagram that schematically shows components of software running on computer system 20 that are relevant to data storage on HDD 40 and SSD 42, in accordance with an embodiment of the present invention. A software application 60 interacts with the storage devices (HDD 40 and SSD 42) via an operating system (OS) 62 of the computer system. This interaction typically comprises reading and writing of both data files and program files of the application, which have been stored on either the HDD or the SSD. As noted earlier, at the time of installation of application 60 on the computer system, the application files may be distributed so that some of the files are on the HDD and others are on the SSD. If the SSD contains the OS kernel files, for example, the minority files of the application may also be stored on the SSD, while some or all of the majority files are stored on the HDD. Alternatively, all of the application files may be stored on the HDD. Methods for effecting these sorts of distributions are described further hereinbelow.

Application 60 accesses files on the HDD and SSD via a file system 64 of OS 62, as is known in the art. Optionally, the operating system may comprise a volume manager 66 (sometimes referred to as a volume partition manager), which serves as an intermediary between the file system and underlying storage drivers, in order to determine which directories or files are stored on each of the storage devices. In this case, the volume manager decides where to store each file, and the HDD and SSD may appear to the file system as a single storage volume. This approach is advantageous in that it makes the choice of storage device transparent to the application and file system, and thus may simplify file access. On the other hand, implementation of the volume manager requires changes at the level of the OS kernel which may be difficult to implement in practice. Therefore, in some of the methods that are described hereinbelow, it is assumed that volume manager 66 does not exist, and file system 64 treats the SSD and HDD as separate storage drives. For example, SSD 42 may be configured as drive C:, while HDD 40 is configured as drive D:.

File system 64 or volume manager 66 accesses each of HDD 40 and SSD 42 via a respective storage class 68, 70, which is also commonly referred to as a software driver. These drivers communicate with the actual storage devices via respective port (or miniport) interfaces 72 and 74. Typically, in the configuration shown in FIG. 1, interface 72 communicates with HDD 40 via the serial ATA (SATA) protocol, while interface 74 communicates with SSD 42 using the PCIe bus protocol. Alternatively, other ports and interfaces may be used for this purpose. The storage drivers and interfaces are standard components, which may be used in the configuration shown in FIGS. 1-3 without change. Alternatively, the principles of the present invention may be applied in other hardware and software configurations, as will be apparent to those skilled in the art.

In an experimental implementation of the principles described above, the files of the Microsoft® Vista™ operating system were stored on SSD 42, while application files and user data of Microsoft Word™ were stored on HDD 40. It was found that roughly 90% of the read operations required to load and run the application are directed to operating system files on the SSD, involving 4 KB random read transactions. Only about 10% of the read operations are to the HDD, where the application files are stored. As the SSD is typically more than fifty times faster at random reading than the HDD, this distribution of the files optimizes system management and causes the Word application to load and run much faster (typically more than 20% percent faster). The responsiveness of the application is further enhanced, as noted earlier, by the fact that SDD and HDD transactions may go on in parallel. This example illustrates the performance advantages that may be gained by sorting files for storage in accordance with the methods described herein.

Installing Files on Heterogeneous Storage Media

Determination of which files are to be stored on SSD 42 and which on HDD 40 depends on respective characteristics of the storage media, on access properties of the files themselves, and on user and host properties. The host properties comprise parameters that describe the hardware of the computer system, some of which may be read from management files of the operating system. The user properties may include a predicted use profile of the computer system.

The predicted use profile typically takes into account the behavior, characteristics and preferences of the user of the computer system. The user may indicate these factors by filling out a form or otherwise providing manual input to the computer system. The user preferences may thus indicate weights to be assigned to factors such as:

power saving;
boot time;
silence of operation;
responsiveness of operation; and
portability (weight).

Alternatively or additionally, a "scout" program may monitor and log certain parameters of computer use by a given user.

Thus, it may be determined (by user input or by means of the scout program) that the computer system is to be used primarily for games, or for Internet browsing, or for office applications. As a result, files belonging to the preferred type of application will receive greater weight for installation on SSD 42, so that the performance of this application type will be enhanced. The use of the predicted use profile in deciding where files should be stored is described further hereinbelow with reference to FIG. 5.

Some key characteristics of the storage media are listed by way of example in Table I below:

TABLE I

STORAGE MEDIA CHARACTERISTICS

| | HDD | SSD |
|---|---|---|
| Power consumption | High | Low |
| Reliability | Medium | Very good |
| Sensitivity to motion | High | Low |
| Weight | Medium | Low |
| Audible noise | Medium | Low |
| Cost/GB | Low | High |
| Random read time | High | Low |
| Capacity | High | Medium |
| Sequential write time | Medium | Medium |
| Wear due to rewrite | Low | Medium-High |

The access properties of the files that are taken into account in determining where given files are to be stored may include, for example:

read frequency;
write frequency;
size of storage quanta for rewriting of the files;
size of the files; and
type of data in the files.

Typical host properties may include:

storage cost (absolute or per unit, such as cost per GB);
patterns and frequency of random and sequential read access;
power consumption;
total storage capacity (absolute and/or available); and
system age.

The above lists of media characteristics, file access properties, and user and host properties are not meant to be exhaustive, and other characteristics and properties may also be taken into account. Furthermore, the different characteristics and properties are not necessarily all given equal weight in deciding where files are to be stored. Rather, each characteristic and property may have its own weight, which may be assigned by the user of the computer and/or based on the use patterns of the user (such as the types of applications that the user most typically runs), as well as on the host properties.

Alternatively, the weights may simply be pre-assigned in a file installation program. The decision as to which files to store on which media may then be based on a weighted combination of the factors.

Table II below shows an example of how and why operating system and application files might be distributed between HDD 40 and SSD 42 in one embodiment of the present invention, based on the above considerations:

TABLE II

FILE STORAGE DISTRIBUTION

| Type of files | Where stored | Reason |
| --- | --- | --- |
| OS program files | SSD | Frequently read, but rarely rewritten, and size does not change. |
| Page files and swapping files | HDD | Frequently written, and permitted to be on a different volume from OS. |
| Os program data and indexing (registry) | SSD | Basic part of OS kernel, read continually. |
| Shadow copy and system restore | SSD | Infrequently rewritten, and required by Windows to be on system drive. |
| Recycle bin (repository for deleted files) | SSD/HDD | Infrequently rewritten, and required by Windows to be on the same drive as the deleted files. |
| Hibernating file | SSD | Associated with OS kernel, because BIOS activates boot drive upon resume. |
| Application minority files | SSD | OS provider requires these files to be on the same drive as the kernel. |
| Application majority files | HDD/SSD | Files requiring frequent read in small quanta may be on SSD, other files on HDD. |
| Web browser client and temporary files | HDD | Frequently written, expands to large data size. |
| User files | HDD | Frequently written, expands to large data size. |

Implementing the sort of distribution that is shown in the table may require certain changes in the default deployment of the operating system. Program scripts that may be used to effect these changes in the Windows Vistas environment are listed below in an Appendix.

FIG. 4 is a flow chart that schematically illustrates a method for installing files on computer system 20, in accordance with an embodiment of the present invention. The terms "install" and "installation" are used in the present patent application and in the claims in the conventional sense of these words in the field of computer systems and software, to mean storing the files of a software package on the storage media of a computer system in such a way as to enable the computer thereafter to run the software. Typically, both the OS and application software must be installed in this manner. A specialized installer program may be used to install the application files in the manner described hereinbelow. Alternatively, some or all of the steps below may be carried out by manual configuration, under the control of a system manager or expert user.

Before system 20 can be used, the OS kernel is installed on SSD 42, at an OS installation step 80. Other OS files are typically installed on the SSD, as well, as shown above in Table II, although some of the OS files may be installed on HDD 40. When SSD 42 is retrofitted into an existing computer system, which previously had only a HDD, step 80 may involve transferring the OS files from the HDD to the SSD and renaming the HDD from drive C: to drive D:.

After installation of the OS image, system 20 receives an application software package for installation, at an application acceptance step 82. The minority files of the application, such as the common files, which are required to be on the same drive as the OS kernel, are installed on SSD 42, at a minority installation step 84. Various methods may be used to enable the installer to automatically identify which files to store on SSD 42 and which to store on HDD 40. For example, a file attribute field in the file metadata may be designated for storage of an identifier or other information indicating the destination drive for each file.

The majority files of the application are classified for storage on the HDD or SSD, at a file classification step 86. This classification may be based on automatic computation of a score, which takes into account the storage media characteristics (such as those listed above in Table I) and file access properties. One method that may be used for this sort of classification is described hereinbelow with reference to FIG. 5. Alternatively or additionally, the classification may be performed interactively based on user input.

The process of classification at step 86 may be time-consuming, particularly in large applications that use many files. In order to reduce the installation time, the files may be pre-classified by the application supplier or system manager into three disjoint groups: minority files, majority files that are to be stored on the HDD, and files requiring custom classification. Typically, most of the majority files will be pre-classified for storage on the HDD, and only a relatively small number of performance-critical files will require custom classification. The above-mentioned Vista file attributes may be used to flag the files for this purpose. Only the third group must then be classified at step 86. The classification will likely depend on factors that are specific to the computer system and user in question, such as available storage area on the SSD and user preferences and computer use habits.

Based on the classification, each of the majority files is then installed on either the HDD or the SSD, at a file installation step 88. Installation may require some reconfiguration of the directories used by file system 64. For example, the software configuration of most applications that are currently available assumes that all of the application program files (including both minority and majority files) are stored on the same drive as the OS. This constraint may be relieved by the use of appropriate registry entries and links in the file system directories. A method for installing an application of this sort is described hereinbelow with reference to FIG. 6.

When installation is complete, the user of computer system 20 is able to run the application, at an application execution step 90. By placing key majority files, such as frequently-read dynamic link library (DLL) files, together with the OS kernel files on SSD 42, the application will typically run much faster than could be expected using only HDD 40. Symbolic links may be used to deal with calls by applications installed on the HDD to files installed on the SSD, as described hereinbelow with reference to FIG. 6.

FIG. 5 is a flow chart that schematically shows details of a method for classifying majority files of an application at step 86, in accordance with an embodiment of the present invention. The method shown in FIG. 5 relates to only a few selected file access properties by way of example, but in practice other properties may be used, in addition to or instead of the properties shown here. The file access properties are typically evaluated in advance, by gathering statistics regarding the actual performance of the application on a test bed and/or by analysis of the expected use of the program. It is also possible to collect statistics of actual program use during actual operation of the application on system 20, and to use these statistics in subsequent relocation of certain program files.

The method shown in FIG. 5 computes a score for each file that is to be classified. It will be assumed for the sake of simplicity that the score is a single number, and that the files whose scores are above a certain threshold will be stored on SSD 42, while the remaining files are stored on HDD 40. Alternatively, more complex scoring schemes may be used. For each file, the random read frequency of the file during operation of the application is evaluated, at a read evaluation step 100. The greater the read frequency, the higher will be the SSD score.

The probability of rewriting each file (i.e., the frequency of rewriting during a given period of time) is evaluated, at a write evaluation step 102. As noted earlier, in order to extend the lifetime of SSD 42, it is desirable that files written to the SSD not require frequent rewriting. Thus, typically, a high write probability reduces the SSD score at step 102, while low write probability maintains or increases the score, particularly in the case of files that are protected from being rewritten due to user activity.

Size-related file access properties are evaluated at a size evaluation step 104. It is generally desirable to store large files on HDD 40 due to the lower cost of storage on the HDD. At the same time, the most marked speed advantage of the SSD is in reading small quanta, such as 4 KB quanta, which may be transferred in a single read operation. The advantage becomes less significant for longer sequential read operations. Therefore, the SSD score increases as the file size and quantum size decrease.

The scores calculated for different files are weighted according to the characteristics of the storage media and, optionally, according to the predicted use profile of the computer system, as well as properties of the host computer itself (irrespective of the storage media), at a weighting step 106. For example, if the system includes a large-capacity SSD, and the user is insensitive to cost but very sensitive to performance, the weight of the read frequency may be increased, while the weight of the file size is reduced. Other relevant characteristics of the storage media are listed above in Table I. The weighted scores are then combined in calculating a total installation score, which determines which of the majority files are to be stored on SSD 42, at a score computation step 108.

As noted earlier, the user may indicate his or her characteristics and preferences, for use at step 106, by filling out a form or otherwise providing manual input to the computer system. Alternatively or additionally, a "scout" program may monitor and log certain parameters of computer use by a given user, and these parameters may then be applied in weighting the scores computed at step 106 when a new OS or application is to be installed on the computer. For example, Windows Vista includes a memory management program known as "SuperFetch," which actively monitors user behavior and pre-loads frequently-used programs into unused memory. This same monitoring functionality may be used to identify the types of program files that are frequently used, so that these program files (and possibly other program files of the same sort) will be installed on SSD 42.

By the same token, the behavior of a given user may be classified, either by the scout program or by manual input by the user. Thus, it may be determined that the computer system is to be used primarily for games, or for Internet browsing, or for office applications. The user classification may be stored in the OS registry (as part of the PC/user attribute HKEY-_CURRENT_USER, for example). As a result, files belonging to the preferred type of application will receive greater weight for installation on SSD 42, so that the performance of this application type will be enhanced. For example, game-related DLL files will be installed on the SSD for a user who is primarily a gamer, while word processing DLL files will be installed on the SSD for the office application user. This approach enables the system to make optimal use of the limited capacity of the SSD.

FIG. 6 is a flow chart that schematically shows details of a method for installing application files on computer system 20, in accordance with an embodiment of the present invention. This method enables applications to be installed on HDD 40 while the OS is installed on SSD 42 even when the application was designed originally to have all of its files installed on the same drive as the OS (as is the case in most legacy applications). This method may also be used, mutatis mutandis, to permit the minority and majority files of some legacy applications to be distributed between the SSD and the HDD, as at step 88 in the method of FIG. 4.

Most software applications that are currently available for the Windows operating environment, for example, choose the directory path for installation of their majority files in one of the following ways:

1. Hard coding (mainly in older application programs)—The files are installed in C:\Program Files.
2. Default drive—The application files are installed in the Program Files directory of the drive on which the OS files are installed.
3. Smart API—The installation program uses an application program interface (API) to read the default Program Files path from the HKEY_LOCAL_MACHINE record in the registry.

Simply storing the files of such applications on HDD 40 (drive D:) while the OS files are installed on SSD 42 (drive C:) will cause the applications to crash when they attempt to access files in the Program Files directory. This problem is resolved by the steps of the method of FIG. 6 that are described below. Program code implementing these steps is listed below in the Appendix.

After the Windows OS of computer system 20 has been installed on drive C: (SSD 42), the folder C:\Program Files is copied to drive D: (HDD 40), at a folder copy step 110. It is now necessary to delete C:\Program Files, but before doing so, the Windows Defender service must be stopped, and all processes run from C:\Program Files must be killed. (Such processes include the side bar and Windows Defender application, for example). At this point, C:\Program Files is deleted, and the Windows Defender and other processes are restarted from D:\Program Files.

In order to deal with calls by applications installed on D:\ to files in C:\Program Files (without changing the applications themselves), a symbolic link is created from C:\Program Files to D:\Program Files, at a link creation step 112. A symbolic link is a file-system object that points to another file-system object, which is referred to as the target of the link. Symbolic links may be created in the Windows Vista environment, for example, using the mklink command line utility. A symbolic link to a file is also known as a hard link, while a symbolic link to a folder or volume is known as a junction point. Although the method of FIG. 6 is described with respect to the Windows operating environment and uses certain terminology that is specific to that environment, the principles of this method may similarly be applied in other operating systems that support file system links of this sort, such as UNIX®.

Symbolic links are transparent to users, as well as to applications. The links appear as normal files or directories, and can be acted upon by the user or application in exactly the same manner. They cause file operations directed to the link, however, to be carried out instead on the target. Thus, after creation of the symbolic link at step 112, read and write operations directed to files in C:\Program Files will be carried out automatically on the corresponding files in D:\Program Files. The invisibility attribute of C:\Program Files may be set so that users do not accidentally try to browse or delete the junction point created at step 112.

In addition, it is desirable that the value of the default path entry for program files in the Windows registry (located at HKEY_LOCAL_MACHINE\SOFTWARE\Microsoft\Windows) be changed from C:\Program Files to D:\Program Files, at a registry update step 114. One reason for this change is that before installation of an application program that uses the "Smart API" (item #3 listed above), the installer may check the storage drive containing the default path in order to verify that there is sufficient free space on the drive for all the application files. Thus, if the registry entry were not changed, the installer might infer from the registry entry that the application is to be installed on drive C: and conclude that there is not enough space available on the SSD (even though the symbolic link will actually cause the installation to be carried out on drive D:, where there is sufficient space). Changing the registry entry to D:\Program Files will avoid this eventuality.

After the symbolic link and registry entries have been properly created, an application may be installed, at an installation step 116. A legacy installer will, by virtue of the symbolic link and/or the registry entry, install all of the majority files of the application in D:\Program Files, unless the user specifies a different path for installation. Alternatively, an installer that implements the method of FIG. 4 may select certain majority files to install on drive C:, while installing the remaining files on D:.

Symbolic links may also be used to optimize the performance of computer system 20 when the hardware or software associated with one or more of the storage drives is upgraded. For example, an upgrade to the capacity or the write capabilities of SSD 42 may give rise to a situation in which it would be advantageous to store on the SSD certain files that were previously stored on the HDD. One way to deal with this sort of situation would simply be to uninstall and then reinstall the OS and applications with new file distribution criteria. Another, more convenient option would be to identify the files that should be relocated, then move those files to the SSD and place symbolic links in the previous file locations on the HDD pointing to the new file locations on the SSD.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

Program Listings

This appendix includes listings of script programs for a number of functions that may be used in defining the deployment of files in the Windows Vista environment. The programs assume that the SSD is defined as drive C:, while the HDD is defined as drive D:, as explained above.

1) Moving the Pagefile from C: to D: and Setting it to Static Size ("Change PageFile to D:")—This script uses the registry to save space on the C: drive. It sets the Pagefile to a static file (avoiding defragmentation) and moves it from the system disk, thus increasing the disk performance.

Syntax (Changes the registry with the REG.exe Command):

reg add "HKEY_LOCAL_MACHINE\SYSTEM\CurrentControlSet\Control\Session Manager\Memory Management"/f /v PagingFiles /t REG_MULTI_SZ /d "D:\Pagefile.sys 1505 1505

2) Defining the VSS (System Restore) Storage as 300 MB on C: ("Restrict VSS Storage to 300 MB")—This script uses the Vssadmin.exe command to decrease the system restore footprint on the C: drive. It restricts the VSS Storage cache to use only 300 MB on C:\, thus conserving space.

Syntax (Uses the built in VSSADMIN.exe Command):
vssadmin resize shadowstorage /For=C: /On=C:/MaxSize=300 MB 3) Moving the Temp files from C: to D: ("Change System TEMP to D:")—This script uses the registry to save space on the C: drive, specifically for program installations that use the default %TEMP% or %TMP% system variables and not user-specific choices.

Syntax (Changes the registry with the REG.exe Command):

MD D:\TEMP

REG ADD "HKLM\SYSTEM\CurrentControlSet\Control\Session Manager\Environment"/v TEMP /t REG_EXPAND_SZ /d D:\TEMP /f REG ADD "HKLM\SYSTEM\CurrentControlSet\Control\Session Manager\Environment"/v TMP /t REG_EXPAND_SZ /d D:\TEMP /f 4) Move Program Files from Drive C: to D:—This script makes sure that the user default path for installing any new application is addressed to D:, rather than C:. There are five steps:

1. Copy Program Files from C: to D:.

Script:

@robocopy "C:\Program Files" "D:\Program Files"/B/MIR /COPYALL /R:1000/W:30

2. Disable Windows Resource Protection from C:\Program Files—Stop Windows Defender service. Kill processes that are run from C:\Program Files (side bar and Windows Defender Application).

Script:

@takeown /A /R /F "C:\Program Files"

@icacls "C:\Program Files"/remove "NT Service\TrustedInstaller" /T

@sc stop WinDefend

@taskkill /F /IM sidebar.exe /T

@taskkill /F /IM MSASCui.exe /T

3. Delete C:\Program Files.

Script:

@md 1

@robocopy "1" "C:\Program Files"/B /MIR /SEC /R:0/W:30

@rd "C:\Program Files"

@rd 1

4. Create Junction Point from C:\Program Files to D:\Program Files.
Set invisibility attribute at C:\Program Files so that users do not accidentally browse/delete it.
Script:
@mklink /J "C:\Program Files" "D:\Program Files"
@attrib +H +S "C:\Program Files"/L
5. Change default path in registry from C:\Program Files to D:\Program Files.
@reg ADD HKLM\SOFTWARE\Microsoft\Windows\CurrentVersion /v ProgramFilesDir /t REG_SZ /d "D:\Program Files"/f

The invention claimed is:

1. A method for storing data in a computer having a magnetic hard disk drive (HDD) and an electronic solid-state drive (SSD), the method comprising:
in a computer with an HDD, an SSD and an operating system, the computer being configured so that the HDD and the SSD are each independently accessible by the operating system;
identifying a plurality of files for storage by the computer, the plurality of files including at least a first file and a second file, the second file containing instructions comprising a call to a predetermined location of the first file on the SSD;
defining a predicted use profile of the computer;
selecting a respective one of the HDD and the SSD for the storage of each of the plurality of files in accordance with the predicted use profile;
storing at least the first file at a target location on the HDD;
creating a link on the computer from the predetermined location on the SSD to the target location on the HDD; and
executing the instructions in the second file, whereupon the link directs the call to the target location storing the first file,
wherein defining the predicted use profile comprises determining a primary use of the computer which primary use includes use of a particular type of program.

2. The method according to claim 1, wherein defining the predicted use profile comprises receiving an input from a user indicative of a preference of the user in operating the computer.

3. The method according to claim 2, wherein the input is indicative of a weight to be assigned to a factor relating to the computer, the factor including one or more of:
power saving;
boot time;
silence of operation;
responsiveness of operation; and
portability.

4. The method according to claim 1, wherein defining the predicted use profile comprises automatically monitoring a behavior of a user in operating the computer.

5. The method according to claim 1, wherein the particular type of program is used primarily for games.

6. The method according to claim 1, wherein the particular type of program is used primarily for office applications.

7. The method according to claim 1, wherein selecting the respective one of the HDD and the SSD comprises choosing the respective one of the HDD and the SSD for each of the plurality of files in accordance with respective access properties of each of the plurality of files.

8. The method according to claim 7, wherein the access properties include one or more of:
a read frequency of each of the plurality of files;
a write frequency of each of the plurality of files;
a size of storage quanta for rewriting of each of the plurality of files;
a size of each of the plurality of files; and
a type of data in each of the plurality of files.

9. The method according to claim 1, wherein selecting the respective one of the HDD and the SSD comprises choosing the respective one of the HDD and the SSD for each of the plurality of files in accordance with respective characteristics of the HDD and the SSD.

10. The method according to claim 9, wherein the respective characteristics include one or more storage characteristics of:
a cost of storage media, including the HDD and the SSD;
a random read access time of the storage media for files of a specified type; a capacity of the storage media;
a power consumption of the storage media;
an age of the storage media;
a write access time of the storage media;
an audible noise characteristic of the storage media;
wear of the storage media due to rewriting; and
a sensitivity to motion during operation of the storage media.

11. The method according to claim 1, wherein selecting the respective one of the HDD and the SSD comprises choosing the respective one of the HDD and the SSD for each of the plurality of files in accordance with a property of the computer.

12. The method according to claim 11, wherein the property of the computer includes one or more of:
storage cost;
a pattern of read access;
power consumption;
total storage capacity; and
system age.

13. The method according to claim 1 and wherein the plurality of files includes a software package comprising at least the first file and the second file.

14. The method according to claim 13, wherein the link comprises a symbolic link.

15. The method according to claim 13, and further comprising creating an entry indicating a path to the software package on the HDD in an index maintained by an operating system of the computer system.

16. The method according to claim 1, wherein storing at least the first file comprises moving the first file from the predetermined location to the target location in response to a change in the computer.

17. A method for storing data in a computer system having electronic and magnetic storage media, the method comprising:
in a set of files associated with the computer system, identifying first files having first probabilities of being rewritten and second files having second probabilities of being rewritten that are greater than the first probabilities; and
storing the first files in the electronic storage medium while storing the second files in the magnetic storage medium.

18. The method according to claim 17, wherein the first files are protected so that a user of the computer system is unable to rewrite the first files.

19. The method according to claim 17, wherein the set of files comprises minority files of an operating system of the computer system, wherein the minority files are stored on the electronic storage media.

20. The method according to claim 17, wherein the first and second files respectively comprise first and second program files belonging to a computer program, and wherein the first and second files are stored in a process of installing the computer program on the computer system.

21. The method according to claim 20, wherein the computer program is at least a part of an operating system of the computer system.

22. The method according to claim 20, wherein the computer program is at least a part of an application program that is to run on the computer system.

23. The method according to claim 17, wherein the first files comprise operating system kernel files.

24. The method according to claim 17, wherein the second files comprise page files and swapping files.

25. The method according to claim 17, and comprising storing a hibernation file on the electronic storage medium.

26. The method according to claim 17, and comprising storing a repository for deleted files on the electronic storage medium.

27. The method according to claim 17, wherein the second files comprise application program files.

28. The method according to claim 17, wherein the second files comprise user files and temporary files.

29. The method according to claim 17, wherein at least one of the first and second files contains instructions comprising a call to a predetermined location of one of the first files on the electronic storage medium, and wherein the method comprises creating a link on the computer system from the predetermined location on the electronic storage medium to a target location on the magnetic storage medium at which the one of the second files is stored.

30. The method according to claim 17, wherein the computer system comprises first and second storage controllers for the electronic and magnetic storage media, and a central processing unit (CPU) configured to communicate directly with both of the first and second storage controllers.

31. The method according to claim 30, wherein the CPU is configured to run software that comprises a file system and a volume manager, which interfaces between the file system and the first and second storage controllers.

32. The method according to claim 17, wherein the magnetic storage medium and the electronic storage medium are embodied respectively in a magnetic hard disk drive (HDD) and an electronic solid-state drive (SSD), which are independently accessible by an operating system of the computer system.

33. The method according to claim 17 and wherein the electronic storage medium includes one of a Flash memory, a 3D memory, and a one-time programmable memory.

34. The method according to claim 17, wherein:
the first and second files respectively comprise first and second program files belonging to a computer program;
the first and second files are stored on the magnetic storage medium in a process of installing the computer program on the computer system; and
the storing the first files in the electronic storage medium comprises subsequently moving the first files from the magnetic storage medium to the electronic storage medium.

35. A method for storing data in a computer system having electronic and magnetic storage media, the method comprising:
in a set of files, identifying first files having first frequencies of being rewritten and second files having second frequencies of being rewritten that are greater than the first frequencies; and
storing the first files in the electronic storage medium while storing the second files in the magnetic storage medium.

36. The method according to claim 35, wherein:
the first files and the second files are stored on the magnetic storage medium in a process of installing a computer program on the computer system; and
the storing the first files in the electronic storage medium comprises subsequently moving the first files from the magnetic storage medium to the electronic storage medium.

37. A method for operating a computer system having first and second storage drives, the method comprising:
identifying a plurality of files associated with the computer system, the plurality of files comprising at least a first file and a second file, the second file containing instructions comprising a call to a predetermined location of the first file on the first storage drive, and wherein the plurality of files includes a software package comprising at least the first file and the second file;
storing at least the first file at a target location on the second storage drive;
creating a link on the computer system from the predetermined location on the first storage drive to the target location on the second storage drive; and
executing the instructions in the second file, whereupon the link directs the call to the target location storing the first file.

38. The method according to claim 37, wherein the first storage drive comprises an electronic storage medium, and the second storage drive comprises a magnetic storage medium.

39. The method according to claim 37, wherein the software package comprises an application program, and wherein kernel files of an operating system of the computer system are installed on the first storage drive.

40. The method according to claim 39, wherein the first storage drive is identified by the operating system as drive C:, and wherein the second storage drive is associated by the operating system with another drive identifier.

41. The method according to claim 40, wherein the link comprises a symbolic link.

42. The method according to claim 37, and comprising creating an entry indicating a path to the software package on the second storage device in an index maintained by an operating system of the computer system.

43. The method according to claim 37, wherein storing at least the first file comprises moving the first file from the predetermined location to the target location in response to a change in the computer system.

* * * * *

UNITED STATES PATENT AND TRADEMARK OFFICE
CERTIFICATE OF CORRECTION

PATENT NO. : 7,899,987 B2  
APPLICATION NO. : 11/861165  
DATED : March 1, 2011  
INVENTOR(S) : Tavi Salomon et al.

Page 1 of 1

It is certified that error appears in the above-identified patent and that said Letters Patent is hereby corrected as shown below:

In the Claims

Column 18, claim 15, line 43, after "system of the computer" delete "system".

Signed and Sealed this
Seventeenth Day of May, 2011

David J. Kappos
*Director of the United States Patent and Trademark Office*